United States Patent [19]

Takagi et al.

[11] Patent Number: 4,468,634
[45] Date of Patent: Aug. 28, 1984

[54] CRYSTAL OSCILLATOR PRODUCING TWO FREQUENCIES BY MEANS OF AMPLITUDE MODULATION AND DEMODULATION

[75] Inventors: Michiaki Takagi; Eishi Momosaki, both of Suwa, Japan

[73] Assignee: Kabushiki Kaisha Suwa Seikosha, Tokyo, Japan

[21] Appl. No.: 322,319

[22] Filed: Nov. 17, 1981

[30] Foreign Application Priority Data

Nov. 18, 1980 [JP] Japan ................................. 55-162397
Dec. 10, 1980 [JP] Japan ................................. 55-174170

[51] Int. Cl.³ .......................... H03B 5/36; H03B 25/00
[52] U.S. Cl. ........................................ 331/60; 331/66; 331/158; 331/176; 331/DIG. 3; 374/163
[58] Field of Search ..................... 331/37, 40, 41, 42, 331/43, 56, 60, 61, 116 R, 116 FE, 158, 163, 66, 176, DIG. 3

[56] References Cited

U.S. PATENT DOCUMENTS

| | | | |
|---|---|---|---|
| 3,382,447 | 5/1968 | Racy | 331/60 |
| 3,617,923 | 11/1971 | Paradysz et al. | 331/43 |
| 3,826,931 | 7/1974 | Hammond | 331/163 X |
| 4,079,280 | 3/1978 | Kusters et al. | 310/318 |

Primary Examiner—Siegfried H. Grimm
Attorney, Agent, or Firm—Blum Kaplan Friedman Silberman & Beran

[57] ABSTRACT

An oscillator circuit for simultaneously outputting two frequency signals comprises a single resonator vibrating in two modes at different frequencies, an amplitude modulating circuit for modulating one of said two frequencies with a third frequency, a feedback circuit receiving the output of the amplitude modulating circuit, a detector demodulating the amplitude modulated signal, the demodulated signal being the third frequency used to modulate the output of the resonator. The two frequencies of the resonator are close together in value and the third frequency signal is the difference in frequency of the two resonator outputs. Circuit outputs are one resonator frequency and the difference frequency.

9 Claims, 12 Drawing Figures

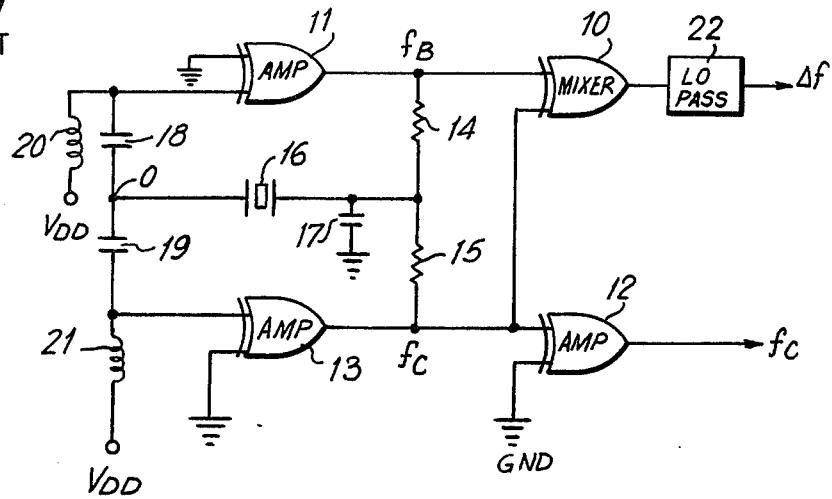
FIG.1 PRIOR ART
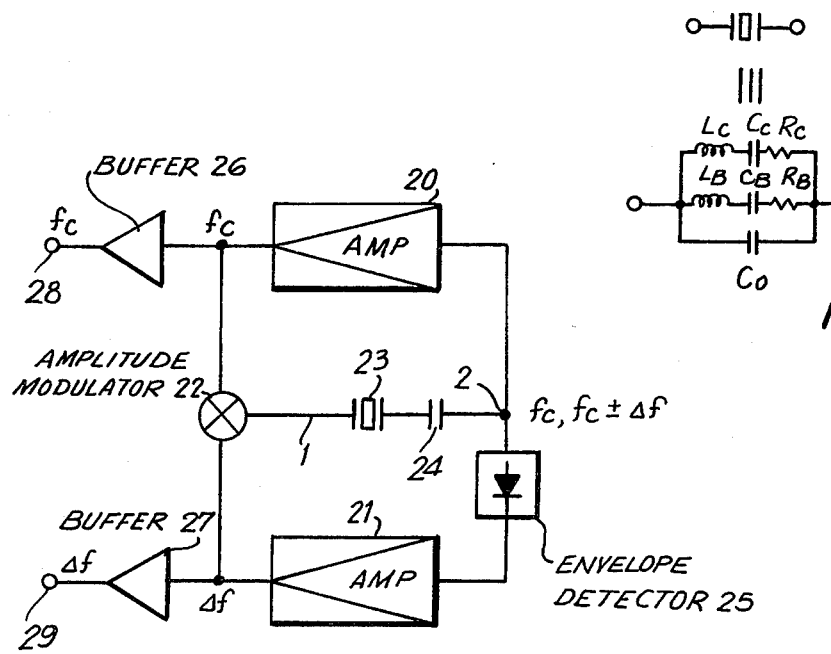
FIG.3a
FIG.3b

CRYSTAL OSCILLATOR PRODUCING TWO FREQUENCIES BY MEANS OF AMPLITUDE MODULATION AND DEMODULATION

BACKGROUND OF THE INVENTION

This invention relates generally to a thermometer circuit and more particularly to an oscillator circuit which depends upon the difference between two frequencies to detect and indicate temperature. Conventional thermometers use as a temperature sensor a thermistor, a thermocouple, the base-emitter junction of a transistor, a quartz crystal vibrator having a thickness-shear mode of vibration, and others. The temperature sensors, excepting the quartz crystal vibrator, are required to convert a voltage, or an analog quantity that is a function of a measured temperature to a corresponding digital quantity. The measuring device consumes a high level of energy and is large in size. With the quartz crystal vibrator, temperatures can basically be measured with a frequency counter as the quartz crystal vibrator allows a frequency to be detected in proportion to a temperature. The thickness-shear mode vibrator, however, is large-sized, vibrates at a high frequency of several megahertz, and consumes a large amount of electrical power. These are undesirable features for a thermometer.

It is desirable to provide a circuit and a temperature measuring device which generate two resonant frequencies and use the varying difference between the two resonant frequencies as an indicator of temperature. Central to such a circuit is a vibrator such as a quartz crystal vibrator, a ceramic vibrator or the like which should have a Q of 10,000 or higher. The oscillator circuits include tuned elements for the respective oscillation frequencies and circuit means for mixing the frequencies so as to obtain a difference frequency. A difficulty in earlier circuits occurs when the two oscillation frequencies are close to each other, or when the ratio of the difference frequency to the vibration frequencies is in the order of 1/1000. Then it is necessary that the tuned circuits should have a Q of 1,000 or more. Nevertheless, there is difficulty for the tuning circuits, generally LC tuned circuits, to separate the two frequencies. When the difference between the frequencies varies greatly, as is desirable in a sensitive temperature measurement, the range of difference frequencies in comparison with the frequency of the half-width of the tuned circuits necessitates that the coils and capacitors of the tuned circuits be replaced with other inductances and capacitances of different values. The result is a large sized instrument including many costly components.

What is needed is an oscillator circuit for a thermometer which is small in size, low in cost, and extremely accurate over a wide range of operation.

SUMMARY OF THE INVENTION

Generally speaking, in accordance with the invention, an oscillator circuit for a quartz crystal thermometer of small size, low cost and high precision is provided. The circuit, including a mode coupled tuning fork resonator, has two frequency signal outputs. The first or carrier mode vibration is a constant in frequency with temperature while the second vibrational mode, somewhat different in frequency from the first mode, is strongly temperature-dependent. The circuit provides a difference frequency signal which varies widely with temperature variations and is ultimately decoded to operate a display of temperature data. The carrier frequency output provides the input for a highly accurate timepiece which is combined in the same device. The feedback to the vibrator comprises a carrier frequency which is amplitude modulated by the difference frequency. The output difference signal is obtained by detecting the modulated carrier. Tuned LC circuits which are large and costly are not required.

Accordingly, it is an object of this invention to provide an improved oscillator for a quartz crystal thermometer which outputs a standard carrier signal at fixed frequency and a secondary signal which varies widely with temperature variations.

Another object of this invention is to provide an improved oscillator for a quartz crystal thermometer which includes a resonator outputting two frequency signals, the difference between the two frequencies being indicative of the temperature.

A further object of this invention is to provide an improved oscillator for a quartz crystal thermometer which is small in size, simple in construction and extremely precise.

Still another object of this invention is to provide an improved oscillator for a quartz crystal thermometer which also provides an output for a high-precision timepiece.

Still other objects and advantages of the invention will in part be obvious and will in part be apparent from the specification.

The invention accordingly comprises the features of construction, combination of elements, and arrangement of parts which will be exemplified in the construction hereinafter set forth and the scope of the invention will be in the claims.

BRIEF DESCRIPTION OF THE DRAWINGS

For a fuller understanding of the invention, reference is had to the following description taken in connection with the accompanying drawings, in which:

FIG. 1 is a conventional oscillator circuit capable of simultaneously oscillating and outputting at two frequencies;

FIGS. 3a and 3b are schematics for an oscillator circuit in accordance with the invention;

DESCRIPTION OF THE PREFERRED EMBODIMENTS

Figure 2:
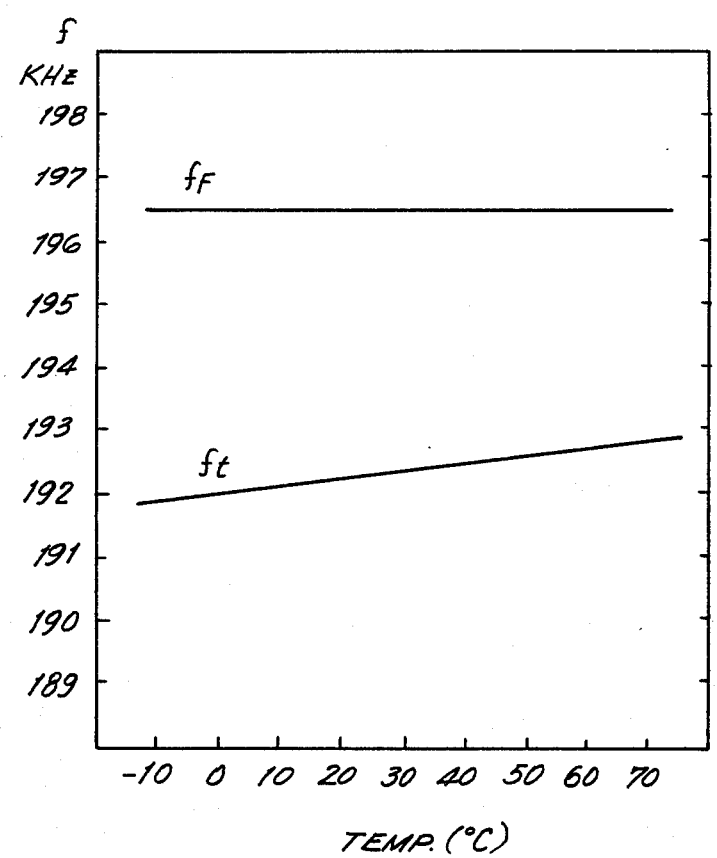
FIG. 2 is a graph of the frequency-temperature characteristics of a mode coupled tuning fork type vibrator.

FIG. 1 is an oscillation circuit including exclusive OR gates 11, 13, each having one input terminal held at the logic level O (ground). These gates 11, 13 serve as amplifiers respectively in two oscillation circuit loops. The circuit also includes a phase shifter comprised of resistors 14, 15 and a capacitor 17 for delaying the phase of output waves from the exclusive OR gates 11, 13. Thus, phase conditions are improved for stabilizing the oscillation frequencies. A resonator 16, such as a quartz crystal vibrator, a ceramic vibrator, or the like should have a Q of 10,000 or higher for good performance.

The combination of a capacitor 18 and a coil 20, and the combination of a capacitor 19 and a coil 21 are each tuned to the oscillation frequency of their respective circuit loops for filtering the combined oscillation frequencies fB, fC produced at the output O of the vibrator 16. These tuned combinations invert the phase of the signals and feed them back to the amplifiers 11, 13. An amplifier 12, composed of an exclusive OR gate, serves as a buffer amplifier for the signal having the frequency fC. A circuit 10, identical to the amplifier 12, mixes the signal waves of the frequencies fB, fC. Then a low pass filter 22 produces an output signal at a frequency which is the difference between the frequencies fB, fC. The circuit components 10–13 are all composed of MOS field effect transistors.

A problem with the oscillation circuit of FIG. 1 is that when the two oscillation frequencies fB, fC are close to each other in value, or when the ratio of the differential frequency $\Delta f$ to the frequency fB or fC is 1/1000, the tuned resonant circuits constructed of a capacitor 18 and coil 20 and capacitor 19 and coil 21 should have a Q of 1,000 or higher. As a result, in the circuit of FIG. 1, it is difficult for the LC tuning circuits to separate the frequencies which are close together. When the difference between the frequencies fB, fC varies greatly in comparison with the half-width frequency of the tuned circuit, the coils and capacitors should be replaced with those of different inductances and capacitances if performance of the device is to be properly maintained. This is cumbersome and costly. The oscillator for a quartz crystal thermometer in accordance with this invention provides an oscillation circuit which overcomes the foregoing shortcomings.

FIG. 2 shows the frequency-temperature characteristics of a quartz crystal vibrator incorporated in a quartz crystal thermometer in accordance with the present invention. The mode coupled crystal vibrator is of small size, having case dimensions in the order of 2 mm in diameter by 6 mm in length and is in the form of a tuning fork. The quartz crystal vibrator relies on a coupling of flexural and torsional modes of vibration, operating to provide an excellent frequency-temperature characteristic having a cubic function. Coupling and other factors compensate for the frequency temperature characteristic of a linear or quadratic nature which ordinary quartz crystal vibrators have. The construction of a mode coupled tuning fork type quartz crystal vibrator is described in pending application Ser. No. 42,732, filed May 29, 1979, now U.S. Pat. No. 4,320,320 and assigned to the assignee of this application.

In FIG. 2, fF indicates the frequency-temperature characteristic of a coupled quartz crystal vibrator operating in a flexural mode of vibration. The frequency-temperature characteristic $(\Delta f/f)$ has a third temperature coefficient $$\gamma = 2 \times 10^{-11}/(°C.)^3$$

and the frequency-temperature characteristic $(\Delta f/f)$ over a temperature range from $-10°$ to $60°$ C. corresponds to 1–2 ppm. The variation in the frequency of the flexural oscillation mode is only about 0.4 Hz for a vibrational frequency of 200 KHz. The temperature coefficient $\gamma$ refers to the coefficient of the third term in a Taylor's expansion representing the frequency-temperature characteristic, as described in the above-mentioned application Ser. No. 42,732.

A torsional mode of vibration ft of the tuning fork resonator provides a resonant frequency which is several KHz lower than that of the flexural mode of vibration. The frequency-temperature characteristic of the quartz crystal vibrator while operating in the torsional mode of vibration is approximately linear for a substantial range of temperatures as indicated in FIG. 2, and has a primary temperature coefficient, that is, slope $\gamma_t = 40$–$50$ ppm/°C. This is a sufficiently large temperature coefficient for a thermometer as described hereinafter. The foregoing mode couple quartz crystal vibrator is called a TM (twin mode) quartz crystal vibrator. The quartz crystal thermometer in accordance with the invention uses the frequency fF of the quartz crystal vibrator both as a frequency standard and a time standard, with ft or $\Delta f = fF - ft$ used as a parameter for temperature detection.

The principles of an oscillation circuit in accordance with the invention are diagramatically shown in FIG. 3a. Therein, amplifiers 20, 21 effect either inverted amplification or non-inverted amplification in oscillation circuit loops for the frequencies fc and $\Delta f$, respectively. An amplitude modulator 22 serves to amplitude modulate the carrier fc with a modulation frequency $\Delta f$. A vibrator 23 has two modes of vibration with closely coupled resonant frequencies, and a capacitor 24 provides a load capacitance for the vibrator 23. A detector 25 effects envelope detection of an amplitude-modulated signal wave which has passed through the vibrator 23. Buffer amplifiers 26, 27 for the signals of the frequencies fc, $\Delta f$, respectively are positioned between the oscillator circuit and the output terminals 28, 29.

FIG. 3B illustrates an equivalent circuit for the vibrator 23 shown in FIG. 3a. A resonant circuit including components LB, CB, and RB, is an equivalent circuit for the mode of vibration at the frequency fB. A resonant circuit including components LC, CC, and RC constitutes an equivalent circuit for the mode of vibration at the frequency fc. A capacitor Co represents the electrostatic capacitance between electrodes of the vibrator.

The oscillation circuit of FIG. 3a oscillates as follows. Assume that the vibrator has two oscillation frequencies fB, fC and equivalent impedances Zb, Zc respectively created upon each oscillation. The frequencies have a relationship of Zb, Zc. With these conditions, a voltage signal of the oscillation frequency fc begins rising at first. The carrier of the frequency signal fc is amplitude modulated by the modulation frequency $\Delta f$, and the amplitude modulated signal wave at the input 1 (FIG. 3a) of the vibrator 23 is composed of three frequency components, namely fc, fc$\pm\Delta f$, and higher harmonics. The amplitude modulated signal wave after having passed through the vibrator 23, comprises a voltage of three frequency components of fc and fc±Δf, which appear at the output 2 of the vibrator 23. The other higher frequency components are removed upon being filtered by the vibrator 23.

The components of fc+Δf and fc−Δf appear at the output of the vibrator 23 since the vibrator 23 has an operating point selected to be in the region where the voltage for driving the vibrator is in a linear relationship with the displacement of the vibrator. Thus, a voltage proportional to an input voltage appears at the output of the vibrator. The amplifier 21 and the oscillation circuit loop of the frequency Δf is designed to have a constant amplification factor and a constant phase transfer characteristic in the range in which the frequency Δf is variable. With such an arrangement, a closed loop comprised of the vibrator 23, detector 25, amplitude modulator 22 and amplifier 21 has a gain in the voltage transfer characteristic, which gain is maximized when Δf=|fc−fB|, a frequency to which is locked the oscillation frequency of the oscllation circuit for Δf. With the oscillation circuit in accordance with the present invention a frequency which is the difference between two resonant frequencies of a vibrator is obtained directly and easily.

Figure 4:
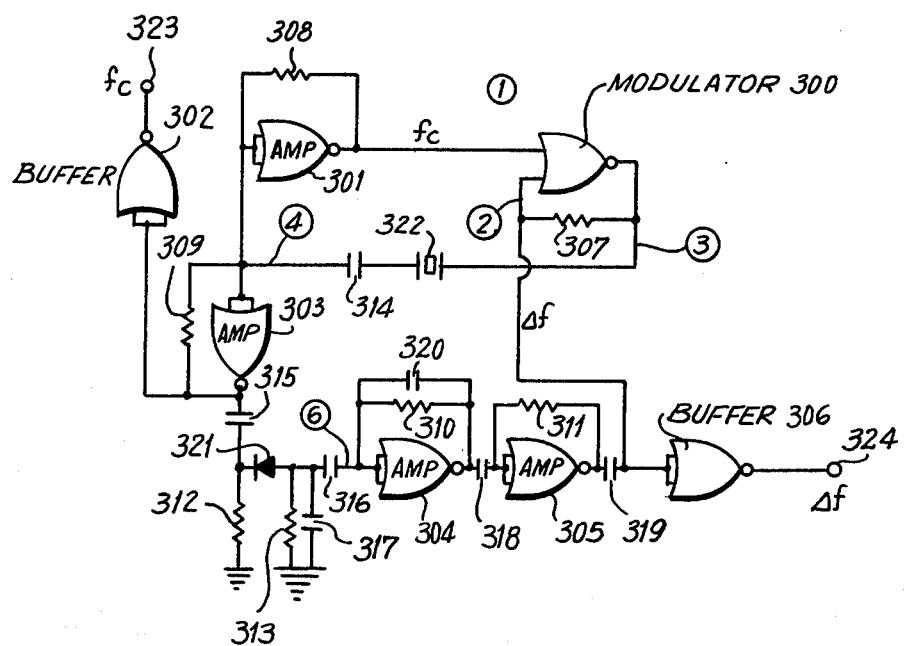
FIGS. 4 and 5 are schematics of two embodiments of oscillator circuits in accordance with the invention.
Figure 5:
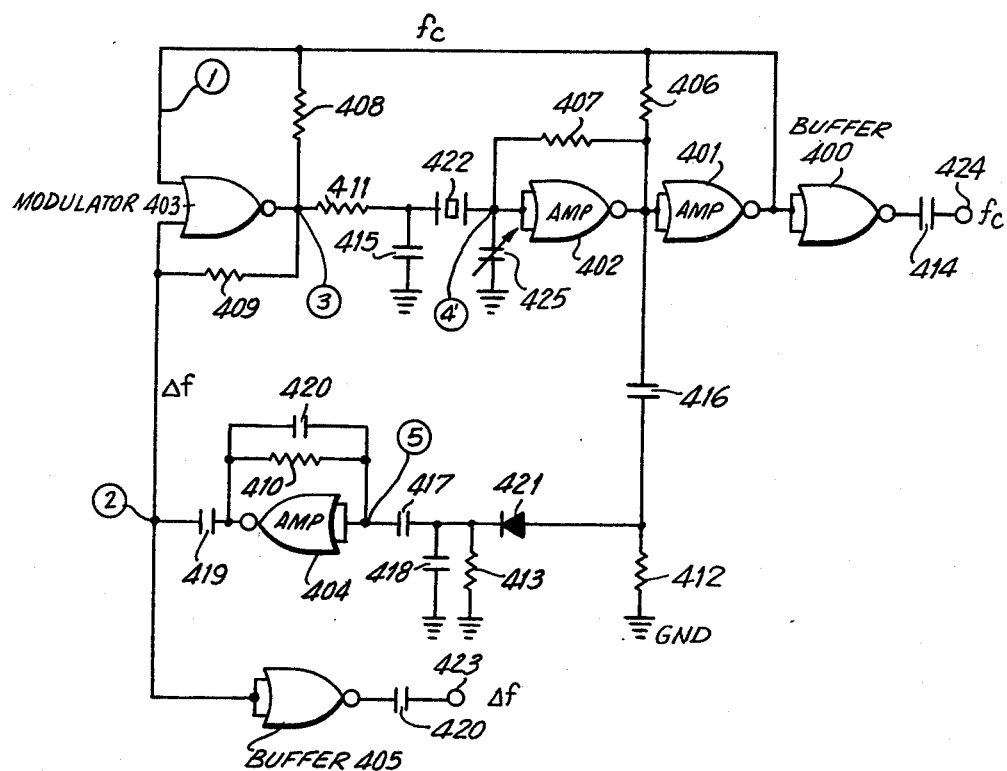

FIGS. 4 and 5 show specific circuit drawings constructed on the principles illustrated in FIGS. 3a and 3b. The oscillation circuits of FIGS. 4 and 5 differ from each other primarily in that the oscillation circuit of FIG. 4 can continue oscillating with a Q of the vibrator being 10,000 or less, whereas the oscillation circuit of FIG. 5 is capable of stable oscillation with a Q of the vibrator being 10,000 or higher.

The oscillation circuits of FIGS. 4 and 5 are now described in detail. In FIG. 4, a modulator 300 is composed of a C-MOS NOR gate having an operating point determined by a resistor 307. Amplifiers 301, 303, 304, 305 are each composed of a 2-input C-MOS NOR gate with two inputs connected. These amplifiers may also be constructed with inverters for performing the same functions. Resistors 308–311 connect the gates and drains of the NOR gates 301, 303, 304, 305 and serve to keep the operating points of the amplifiers at ½ of the power supply voltage VDD. A capacitor 320 reduces the gain of the amplifier 304 in a range of higher frequencies and removes the component of the carrier fc from the difference signal Δf after the latter has been detected. It should be noted that the two amplifiers 304, 305 may be replaced in an alternative embodiment with a single non-inverting amplifier. Inverters 302, 306 serve as buffer amplifiers for the signals for fc, Δf.

A vibrator 322 generates the two vibrational signals and the circuit includes a diode 321, a load resistor 312, a resistor 313 and a capacitor 317 for smoothing the low frequency signal Δf generated by envelope detection of the modulated signal wave by the diode 321. The resistor and capacitor 313, 317 have a time constant RC which is selected to satisfy the relationship 1/fc<RC<1/Δf.

A load capacitor 314 for the vibrator 322 adjusts the oscillation frequency. Coupling capacitors 315, 316, 318, 319 cut off the direct current components in the signal and should have a capacitance sufficiently large for this purpose.

Figure 6:
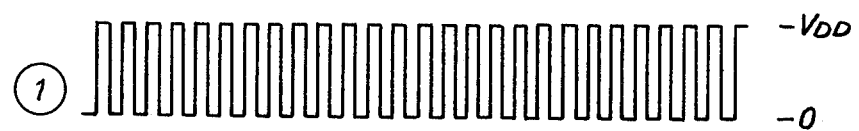
FIG. 6 is waveforms of signals at selected points in the oscillator circuits of FIGS. 4 and 5.
Figure 6:
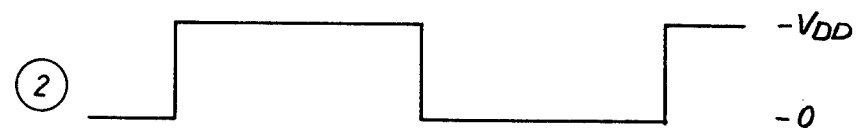
Figure 6:
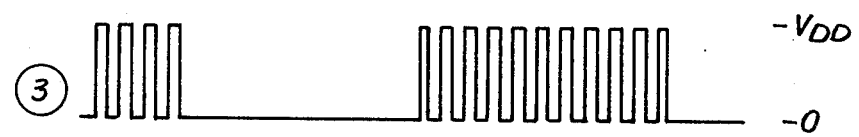
Figure 6:
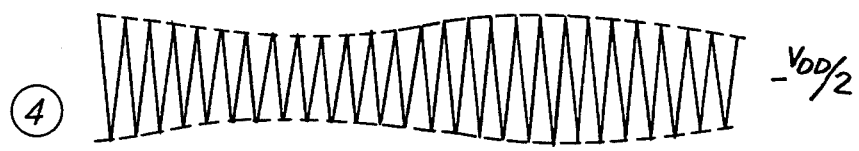
Figure 6:
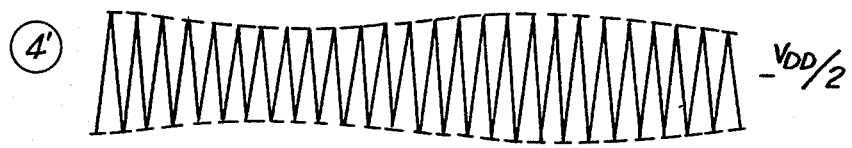
Figure 6:
Figure 6:

Voltage waveforms at several points in the oscillation circuit are shown in FIG. 6. The circled numerals of FIG. 6 correspond with the circled numerals in FIGS. 4 and 5. The carrier fc ① is a square wave having a duty cycle of 50%. This signal ① is clamped at the logic level 0 when a modulation signal ② is at the logic level 1. Thus a modulated signal of the waveform ③ is generated. The signal ④ has passed through the vibrator 322 and is an amplitude-modulated sine wave. The modulating envelope has a frequency of Δf. The carriers as well as the modulation signals Δf in the waveforms ③ and ④ are in phase with each other. Therefore, the series-connected circuit including the vibrator 322 and the capacitor 314 resonate as an equivalent-resistance circuit. With the capacitor removed, a voltage VQ applied across the vibrator and a current IQ flowing through the vibrator form a phase angle between them which is substantially zero. At this time, the electric power p, supplied to the vibrator, is p=VQ·IQ cos φ≈VQ·IA, where φ is the phase angle between VQ and IQ. The power p is thus sufficient to cause a low Q vibrator to oscillate. A waveform ⑥ (FIG. 6) is obtained by amplifying the signal of the waveform ④ and thereafter, detecting the signal along the lower envelope of the waveform.

In an alternative embodiment of an oscillator for a quartz crystal thermometer in accordance with this invention illustrated in FIG. 5, inverters 401, 402, 404 are formed of C-MOS NOR gates having two inputs connected to each other and cooperating with resistors 407, 410 and a capacitor 420 in providing amplifiers. A NOR gate 403 and resistors 408, 409 comprise a modulator circuit. Amplifiers 400, 405 serve as buffers for the signals fc and Δf, respectively. A detector comprises a diode 421, resistors 412, 413 and a capacitor 418. Coupling capacitors 414, 416, 417, 419, 420 cut off direct current components in the signals.

The feedback circuit of the oscillation circuit loop for fc is composed of a trimmer capacitor 425, a capacitor 415, a resistor 411, and a resonator or vibrator 422. The number of inverting amplifiers in the oscillation circuit loop for fc is odd. The waveforms of voltages at major points in the oscillation circuit are illustrated in FIG. 6 and differ from those in the circuit of FIG. 4 in that waveforms ③ and ④ are in phase with respect to Δf, but in opposite phase with respect to fc.

The electric power p=VQ·IQ cos φ supplied to the vibrator 422 is small, as the angle between the voltage VQ applied across the vibrator and the current IQ flowing through the vibrator approximates 90 degrees. Thus, the oscillation circuit of FIG. 5 is suitable for use with a resonator having a high Q. The waveform ⑤ shown in FIG. 6 is obtained by amplifying the signal of the waveform ④ and thereafter detecting it along an upper envelope of the waveform.

Figure 7:
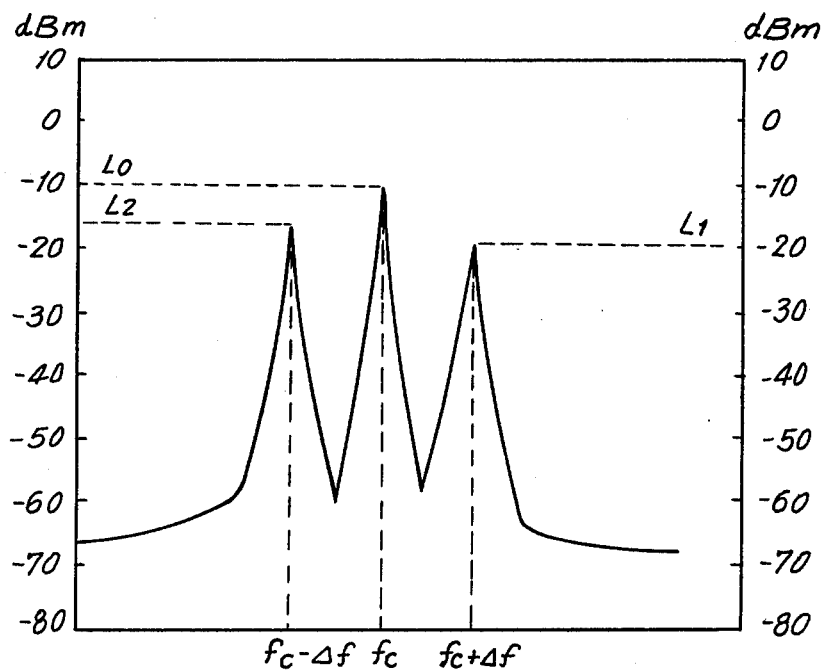
FIG. 7 is a frequency-spectrum diagram for the voltage at selected points in the circuits of FIGS. 4 and 5.

FIG. 7 is a graph showing frequency components as observed with a spectrum analyzer of a voltage at the point ① in the oscillation circuits of FIGS. 4 and 5. The relative energy intensities (spectrum) of the three frequency components fc, fc±Δf indicate that the carrier fc has the highest energy, and the sideband fc−Δf is several dBm larger than the sideband fc+Δf. The voltage of the original amplitude modulated wave can be expressed by the equation:

$$e = A(1 + K \cos pt) \cos wt$$

which can be resolved into $$e = A \cos wt + K/2A(\cos (w+p)t + \cos (w-p)t)$$

wherein e is the voltage of the amplitude modulated wave. A is an amplitude constant; K is the degree of modulation; p is the angular frequency of the modulating signal and w is the angular frequency of the carrier wave.

The spectra of the sidebands become the same at $(\frac{1}{2}KA)^2$. The energy level $L_2$ of the component $fc-\Delta f$ is higher than the energy level $L_1$ of the component $fc+\Delta f$ because one of the two resonant frequencies of the vibrator is the frequency of the carrier and the second mode of vibration of the vibrator, that is, fB is $fc-\Delta f$. This results in an increased energy level in the component $fc-\Delta f$.

Figure 8:
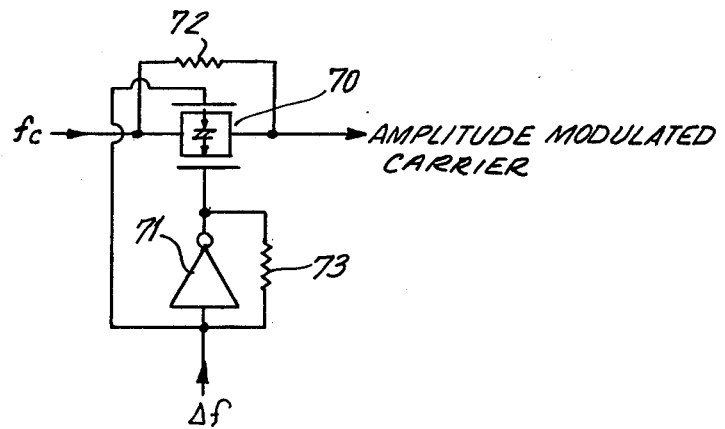
FIG. 8 is a circuit of an amplitude modulator for the oscillator circuits of FIGS. 4 and 5 in accordance with this invention.

FIG. 8 is a modulator circuit in accordance with this invention which differs from the modulator circuits of FIGS. 4 and 5. The foregoing modulators, composed of C-MOS NOR and NAND gates, are not preferred in that the carrier frequency is fully clamped at the logic level 0 or 1, generating a spike voltage at the output of the vibrator, making the latter a mere capacitor in the circuit. The circuit in FIG. 8 avoids such a problem and is comprised of a transmission gate 70, resistors 72, 73, and a C-MOS inverter 71. The resistor 72 serves as both a DC biasing resistor and a bypass resistor for the carrier fc for controlling the degree of modulation. The resistor 73 determines an operating point for the inverter 71 by applying a DC biasing voltage which is $\frac{1}{2}$ of the power supply voltage VDD to the gate of the inverter 71. Because of the resistor 73, the transmission gate 70 remains semiconductive until the modulation signal $\Delta f$ starts rising in oscillation, allowing the carrier signal fc to rise. The circuit of FIG. 8 can replace the amplitude modulators composed of NOR gates shown in FIGS. 4 and 5.

In summary, with the oscillator circuits in accordance with the invention, the resonator used in the oscillation circuits produces two resonant frequencies, one, the carrier frequency fc, which varies very little with temperature, and the other, fB, which varies greatly with temperature. Thus, the frequency carrier fc is available as a frequency standard, and the varying frequency fB is available as a signal for detecting temperatures. It is possible to utilize the above-described oscillation circuits in a temperature sensor or thermometer without tuned LC circuit elements. The oscillation circuits can be fabricated on a single integrated circuit chip for producing a small-sized temperature sensor having a low power requirement. The oscillator cirucit in accordance with this invention is so advantageous in its characteristics and useful that it is expected to find a variety of applications in the future.

Figure 9:
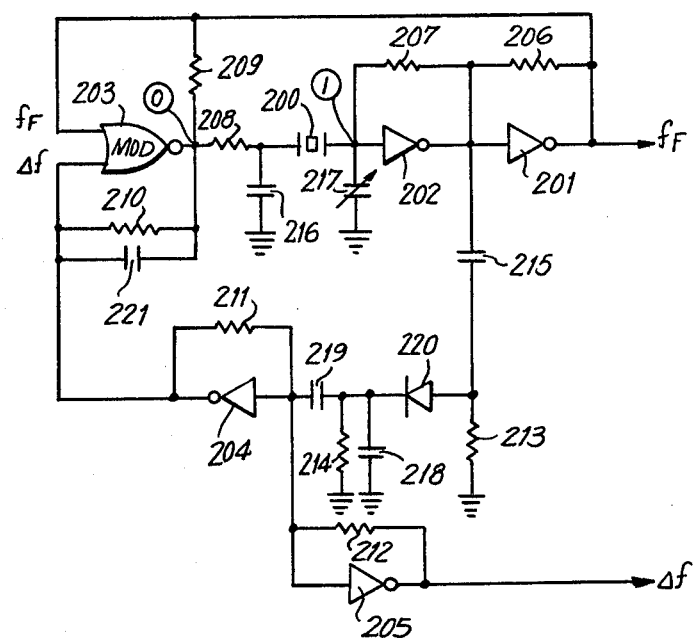
FIG. 9 is an alternative embodiment of an oscillator circuit in accordance with this invention.

FIG. 9 illustrates an alternative embodiment of an oscillator for a quartz crystal thermometer in accordance with this invention. The oscillation circuit is capable of simultaneously generating two frequencies using a twin-mode quartz crystal vibrator as described above. C-MOS inverters 201, 202, 204, 205 provide power amplification, and a C-MOS two-input NOR gate 203 serves as an amplitude modulator. DC biasing resistors 206, 207, 209-212 determine operating points of the amplifiers and the amplitude modulator. A capacitor 221 connected between one of the inputs of the NOR gate 203 and the output thereof reduces frequency components of 10 kilohertz or higher. A resonant circuit for the frequencies fF and ft is composed of a resistor 208, capacitor 216, trimmer capacitor 217, and a twin-mode (T) coupled quartz crystal resonator or vibrator 200.

A detector is composed of coupling capacitors 215, 219, a diode 220, resistors 213, 214 and a capacitor 218.

Principles of operation of this oscillator circuit (FIG. 9) are as follows. The waveform of a voltage at a point ⓞ is such that the carrier frequency, here identified as fF, is amplitude modulated by the modulation frequency $\Delta f$. The waveform of the voltage at the point ⓞ is filtered by the quartz crystal resonator 200, and a superimposed waveform of fF, $ft=fF-\Delta f$ and $fF+\Delta f$ appears at the point identified as ①. Two feedback loops are connected to the point ①. One feedback loop is for feeding a square wave of fF, which is amplified through two stages until it is saturated with the power supply voltage, back to an input of the amplitude modulator 203. The other feedback loop is for amplifying the voltage at the point ① through one stage, detecting an upper envelope of the voltage waveform with the detector, amplifying the signal again, and feeding it in opposite phase back to the amplitude modulator 203. The waveform of a voltage $\Delta f$ is in phase across the terminals of the quartz crystal vibrator 200.

Figure 10:
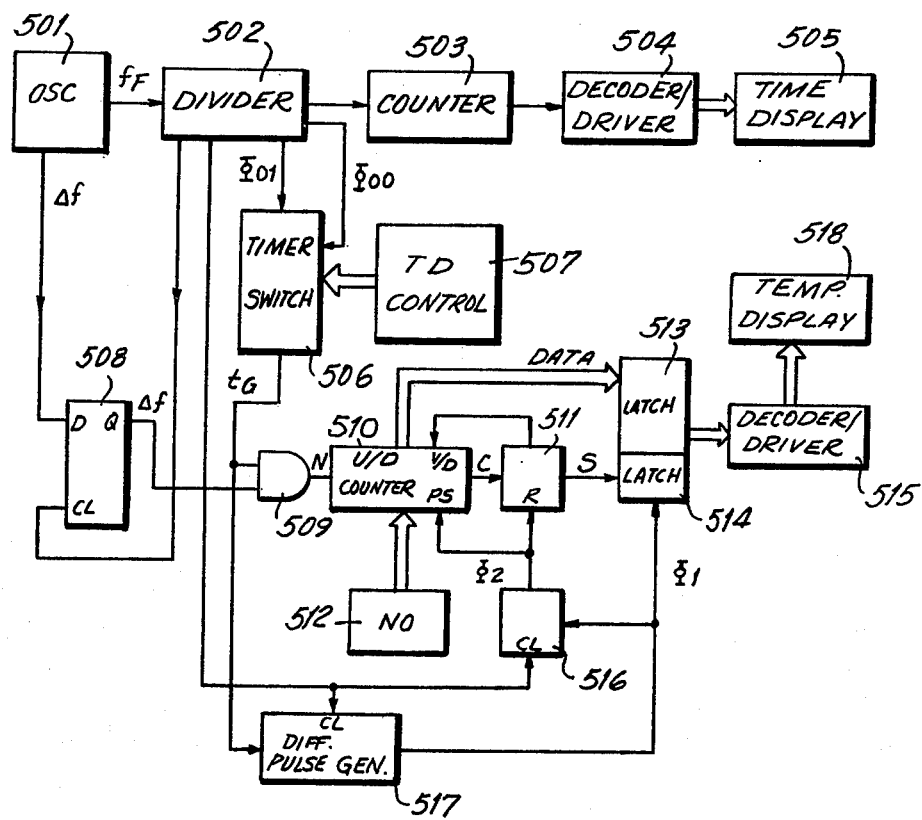
FIG. 10 is a functional block diagram of a quartz crystal thermometer and timepiece in accordance with the invention.
Figure 11:
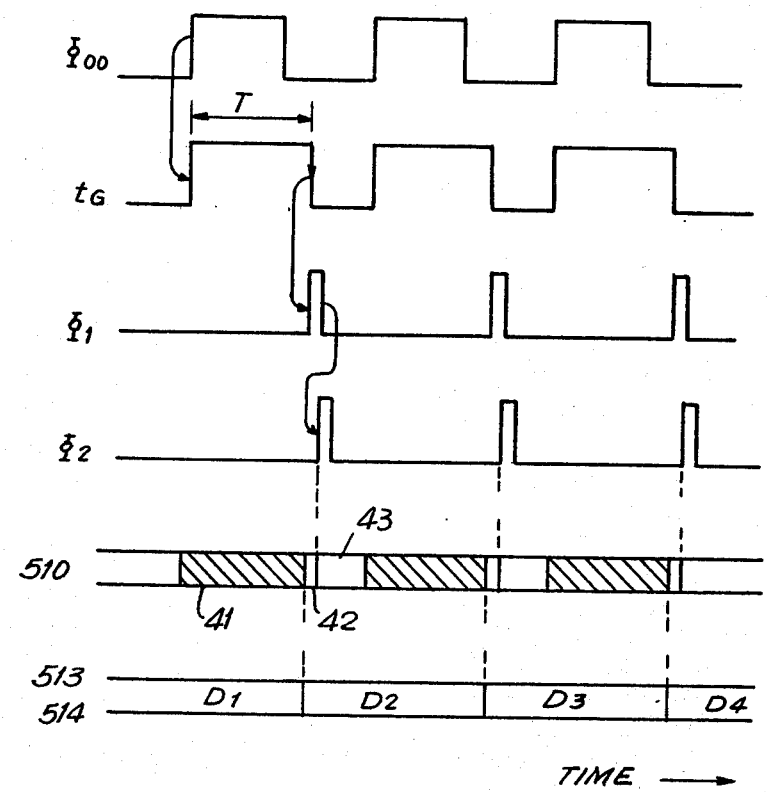
FIG. 11 is a timing diagram for the operation of the device of FIG. 10.

FIGS. 10 and 11 are respectively a block diagram and a timing diagram for operation of a quartz crystal thermometer using the oscillator circuit of FIG. 9. It should be understood that the circuits of FIGS. 4 and 5 are also applicable to the block diagram of FIG. 10.

In the diagram of FIG. 10, an oscillation circuit 501 is structured as shown in FIG. 9. The circuit also includes a frequency divider 502 for dividing the clock output fF from the oscillator circuit 501, and a counter 503 for counting seconds, minutes, hours, dates, and the like, a decoder and driver 504 for driving a liquid crystal display device 505, or the like. The circuit components 501-505 serve as a timepiece.

The quartz crystal thermometer is structured as follows: The waveform of the frequency signal of $\Delta f = fF - ft \approx$ constant$-ft$, generated by the oscillator circuit 501, contains more components of fF when the detector in oscillator 501 has a poor characteristic and the series resonant resistance for the vibration at ft of the twin-mode quartz crystal is large. To prevent malfunctioning due to inclusion of the components of fF, the waveform $\Delta f$ is sampled with a sampling frequency of 10 to 20 kilohertz, which is several times higher than $\Delta f$. This cuts off high-frequency components, thereby obtaining a signal having a constant average frequency of $\Delta f$, the phase of which may fluctuate however. The above operation is carried out by a sampling circuit 508 comprising a D-type flip-flop. A timer switch 506 and a timer switch control 507 produce a timer signal tG having a high interval of time T (FIG. 11) for each clock signal $\phi_{01}$. This gives a minimum resolving power for a time T. The timer switch 506 functions to adjust variations in the frequency-temperature characteristic of the win-mode quartz crystal vibrator for the frequency ft as follows. The difference frequency $\Delta f$ can be expressed by the following equations:

$$\Delta f = \Delta fo + ft\alpha(\theta - \theta_o) \tag{1}$$

$\alpha = -\alpha_t = -40 \sim -50$ PPM/°C. (with reference to the example of FIG. 2)

where $\theta$ is instaneous temperature, $\theta_o$ is the reference temperature 0° C., $\alpha_t$ is the primary temperature coefficient, that is, the slope (FIG. 2) for the characteristic ft and $\alpha$ is the primary temperature characteristic for the difference frequency $\Delta f$. $\Delta fo$ is the frequency difference between fF and ft when $\theta=\theta_o$ and fto is the instantaneous frequency ft when $\theta=\theta_o$. It should be understood that the reference temperature need not be limited to a selected value of 0° C.

At this time, the number N of output pulses generated from an AND gate 509 is expressed by the equation $$N=\Delta fT=\Delta foT+ftoT\alpha(\theta-\theta_o)=No+\Delta N(\theta-\theta_o) \quad (2)$$

For example, in order for a variation $\Delta N$ of ten in the number of pulses N per degree C., the time interval T should be determined so as to meet the conditions of the following equation:

$$\Delta N=ftoT\cdot|\alpha|=10 \quad (3)$$

The time interval T for the twin mode quartz crystal resonator (FIG. 2) can now be calculated. Since $|\alpha|=40$ PPM/°C. and fto=192 kilohertz, T=1.31 seconds as fto$|\alpha|=7.68$ Hz/°C. It is satisfactory for the clock signal $\phi_{00}$ to be applied to the timer switch 506 for a time period of two seconds, resulting in repetitive temperature measurement every two seconds. Where $\Delta N=10$, the minimum resolving power for temperature measurement is 0.1° C. It is apprarent from the equation (3) that variations of the primary temperature coefficient of the twin mode quartz crystal vibrator and fto can be adjusted by changing the time interval T.

The circuit also includes a presettable up-down counter 510, and an external terminal 512 for setting No (in the equation (2)) on the counter 510. Also included are a circuit 511 for memorizing the existence or non-existence of a carry-over output from the counter 510, a circuit 517 for producing a differential pulse $\phi_1$ with the falling edges of two digital signals, high and low, of outputs of the timer switch 506, and a delay circuit 516 for delaying the pulse $\phi_1$. Also included are data latch circuits comprising D-type flip-flops 513,514 and a decoder 515 for converting digital signals from the data latch circuits 513,514 to decimal signals, and a driver for driving a liquid crystal display device 518.

The circuit components 510–518 operate as follows with reference to FIG. 11. Application of a clock pulse $\phi_2$ to the up down counter 510 allows the value No to be preset in the counter 510 from the external terminal 512. As soon as the time signal tG goes to a logic level high, the counter 510 starts counting down with the signal $\Delta f$ passing through the gate 509. When the number N of pulses from the gate 509 to the counter 510 during the time interval T satisfies the relationship $N\geq No$, the counter 510 generates a carry-over signal and at the same time begins to count up. A carry-over signal C is stored in the circuit 511 which may be a one-bit counter.

When $N<No$, no carry-over signal is produced by the counter 510 and the circuit 511 is held at a low level at its output. Operation and conditions of data D in the counter 510 and latch circuits 513,514 are shown in FIG. 11. There is a counting mode 41 in sychronization with the high signal tG during the time period T, a period 42 for holding of data, and a period 43 for presetting the up down counter 510. The storage circuit 511 produces an output signal S which, when at the low level, indicates a positive temperature relative to the reference temperature $\theta_O$ and when at a high level indicates a negative temperature relative to the reference. The circuit shown in FIG. 10 may be constructed as a C-MOS integrated circuit which uses a small electrical current of only several micro-amperes.

The data D accumulated in the up down counter during the period T is read into the latch circuits 513,514 prior to presetting of the up down counter by the signal $\phi_2$ which is delayed in the circuit 516 as indicated in FIG. 11. The count, that is, the data in the up down counter at the end of the period T represents the temperature difference from the standard reference temperature over the substantially instaneous time period T. The data is decoded by the decoder driver 515 and visually displayed by the temperature display 518.

Thus, as described above, the quartz crystal thermometer, in accordance with the present invention, is simple in circuit construction, has a resolving power in the order of 0.1° C., is small in size, and can also serve as a timepiece. Thus, many applications are anticipated in the future for the quartz crystal thermometer and the oscillator circuit in accordance with this invention.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An oscillator circuit for simultaneously outputting first and second frequency signals comprising:
    a single resonator vibrating in two modes at said first frequency and a third frequency;
    an amplitude modulating circuit for modulating said first frequency with said second frequency;
    a feedback circuit including said resonator and passive circuit components, said feedback circuit receiving said amplitude modulated signal;
    a detector operating on said amplitude modulated signal from said feedback circuit, the output signal of said detector being at said second frequency, said output signal of said detector being input to said amplitude modulating circuit for modulating said first frequency signal;
    first amplifier means directly amplifying an output signal of said feedback circuit, said amplified signal being input to said amplitude modulator as said first frequency for modulation; and
    second amplifier means operating on said output signal from said detector, the output of said second amplifier means being said second frequency input to said amplitude modulation circuit, said first and third frequencies being close together in value and said second frequency modulating signal is the difference frequency of said first and third frequencies.

2. An oscillator circuit as claimed in claim 1, wherein said amplitude modulator comprises a C-MOS two input logic gate receiving said second frequency signal and said first frequency signal at respective inputs, said first and second amplifier means each including a C-MOS inverter, a DC biasing resistor coupled between the input and the output of said inverter and a capacitor coupled in parallel with said second amplifier means for improving the frequency characteristic, and said detector comprises a diode, a smoothing resistor, and a capacitor, said resistor and capacitor being connected in parallel between the anode of said diode and common, said diode, resistor and capacitor together effecting envelope detection of said amplitude modulated signal.

3. An oscillator circuit as claimed in claim 1, wherein said amplitude modulator comprises:
- a C-MOS transmission gate having an input and an output terminal and two control terminals and a first resistor connected between said input and output terminals of said gate, said C-MOS transmission gate receiving at one of said control terminals thereof said modulating signal;
- a second resistor, said second resistor being connected between said control terminals of said C-MOS transmission gate;
- and a C-MOS inverter coupled to opposite terminals of said second resistor, said C-MOS inverter receiving said modulating signal at its input and having an output connected to the other of said control terminals of said C-MOS transmission gate.

4. An oscillator circuit as claimed in claim 1, wherein said first amplifier means includes and odd number of inverter amplifiers and said feedback circuit has a first capacitor and a second capacitor respectively connected at opposite terminals of said resonator said feedback circuit being connected to a series resistor, said series resistor being intermediate the output of said amplitude modulating circuit and said resonator.

5. An oscillator circuit as claimed in claim 1, wherein said feedback circuit comprises said resonator, and said first amplifier means includes an odd number of inverter amplifiers.

6. An oscillator circuit as claimed in claim 5, wherein said feedback circuit further includes a capacitor connected in series with said resonator.

7. An oscillator circuit as claimed in claim 1 wherein, at least some of said circuit components, excepting said resonator are part of a single integrated circuit chip.

8. An oscillator circuit as claimed in claim 1, wherein said amplitude modulator comprises a C-MOS two input logic gate receiving said first frequency signal and said second frequency signal at respective inputs, said first and second amplifier means each including a C-MOS inverter and a DC biasing resistor coupled between the input and the output of said inverter, said second amplifier means having a capacitor coupled between the input and the output of the inverter in said second amplifier means for improving the frequency characteristic, and said detector comprising a diode, a smoothing resistor, and a capacitor, said smoothing resistor and said capacitor being connected in parallel between the cathode of said diode and common, said diode, resistor and capacitor together effecting envelope detection of said amplitude modulated signal.

9. An oscillator as claimed in claim 1, wherein said feedback circuit comprises a capacitor and the resonator connected in series, said first amplifier means including an even number of inverter amplifiers.

* * * * *